Sept. 12, 1944.  A. R. LINDSAY  2,358,172
VEHICLE BODY, ESPECIALLY DRIVER'S CAB
Filed Aug. 2, 1940  3 Sheets-Sheet 1

INVENTOR
Alexander R. Lindsay
BY
ATTORNEY

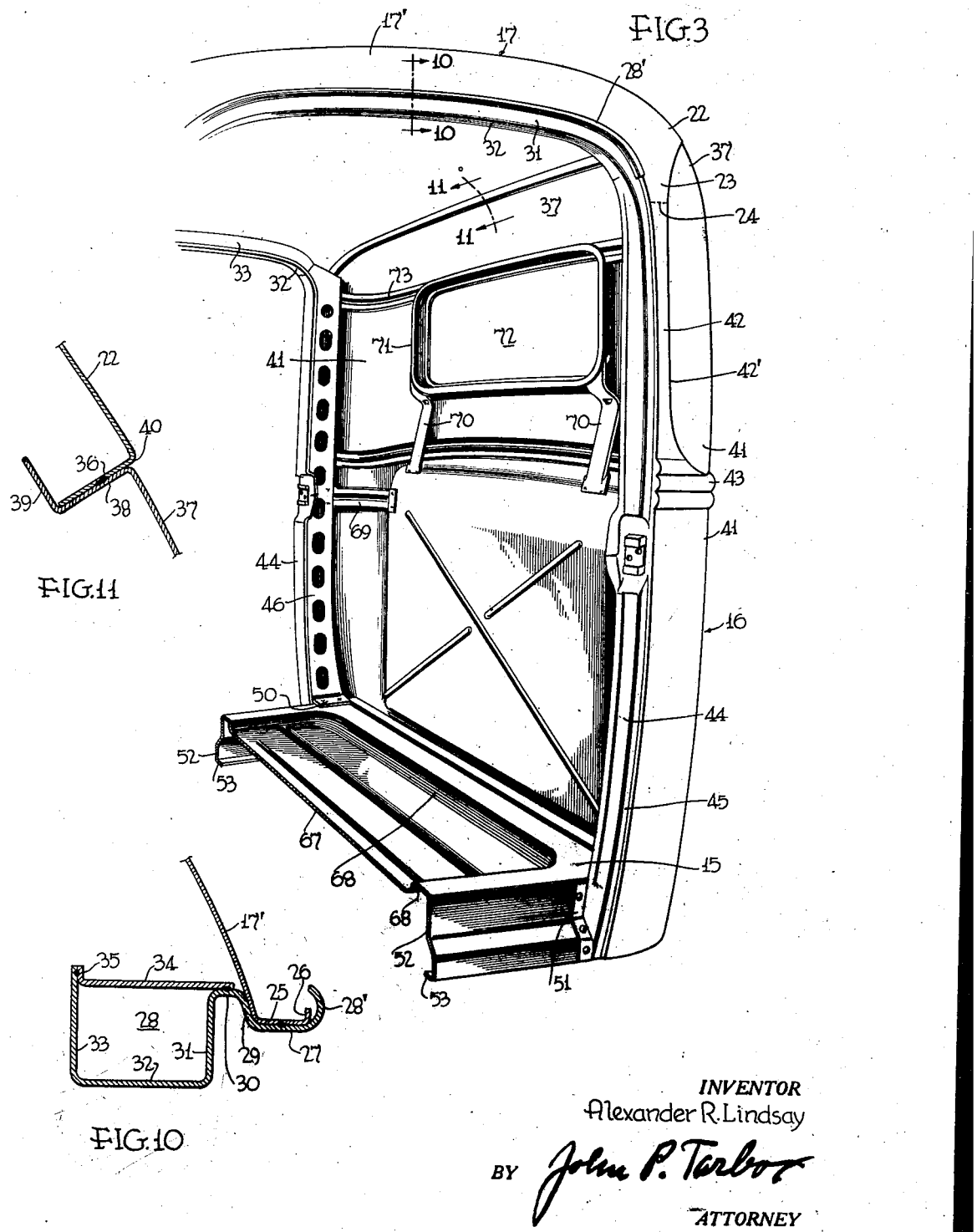

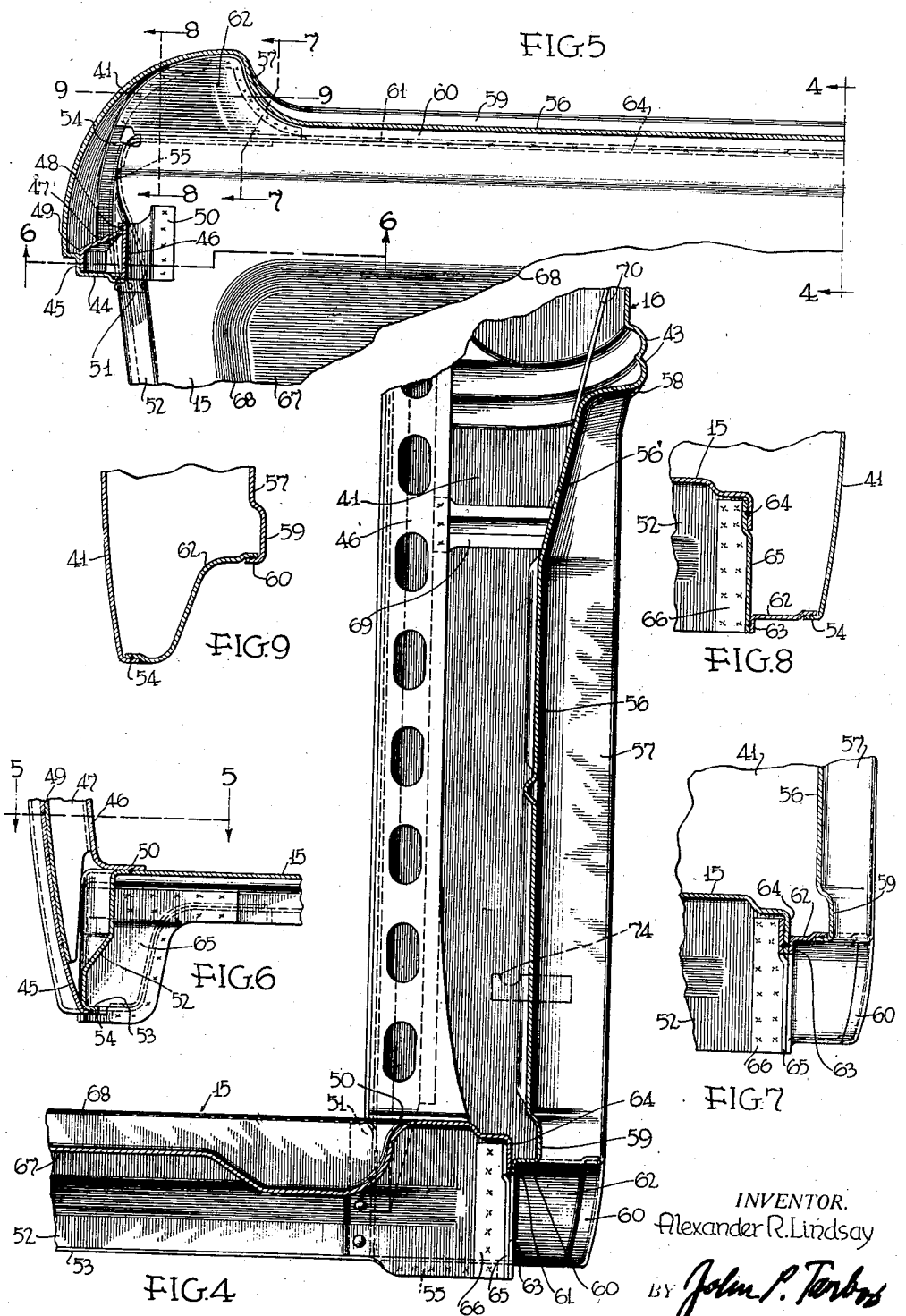

Patented Sept. 12, 1944

2,358,172

UNITED STATES PATENT OFFICE 2,358,172

VEHICLE BODY, ESPECIALLY DRIVER'S CAB

Alexander R. Lindsay, Detroit, Mich., assignor to Edward G. Budd Manufacturing Company, Philadelphia, Pa., a corporation of Pennsylvania Application August 2, 1940, Serial No. 349,729

14 Claims. (Cl. 296—28)

The invention refers to improvements in vehicle body constructions and more particularly in the construction of driver's cabs as used for trucks and the like.

It is among the objects of the invention to simplify the body or cab construction without impairing the strength.

Another object of the invention refers to means and an arrangement for the connection of two adjoining panels so as to make this connection simple and so as to avoid the necessity of extensive finishing operations.

Some of the objects of the invention are attained by providing the rear wall of a driver's cab with an integral forwardly extending offset section below the belt line, and by eliminating at the same time the greater part of the reinforcing braces which extend usually across the space now occupied by the new offset portion.

Another feature of the invention consists in the connection between the rear wall of the cab with the floor panel and the rear door post so that these connections afford strong reinforcing means.

Still further features of the invention consist in the formation of a deep recessed portion in the floor panel for the reception of a fuel tank or other parts and in marginal flanges on the floor panel which form together with the adjoining marginal parts of said recessed portion hollow section intercommunicating rail structures.

Other objects of the invention are attained by slightly offsetting two adjoining panels with respect to each other along their margins which overlap and are connected to each other by inwardly extending flanges.

Further objects, features and advantages of the invention will appear from the following description of an embodiment when read together with the attached drawings.

In the drawings:

Figure 3 is a perspective three-quarter front view of the rear wall of the cab and of the adjoining body portions, the floor panel being shown in transverse section.

Figure 4 is a section through the lower half of the rear wall along lines 4—4 of Figures 2 and 5.

Figure 5 is a fragmentary horizontal section through the lower part of the rear wall along lines 5—5 of Figures 2 and 6.

Figures 6, 7, 8 and 9 are fragmentary sections along the correspondingly numbered lines of Figure 5.

Figure 10 is a fragmentary section along lines 10—10 of Figures 1 and 3.

Figure 11 is a fragmentary section along lines 11—11 of Figures 2 and 3.

Figure 1:
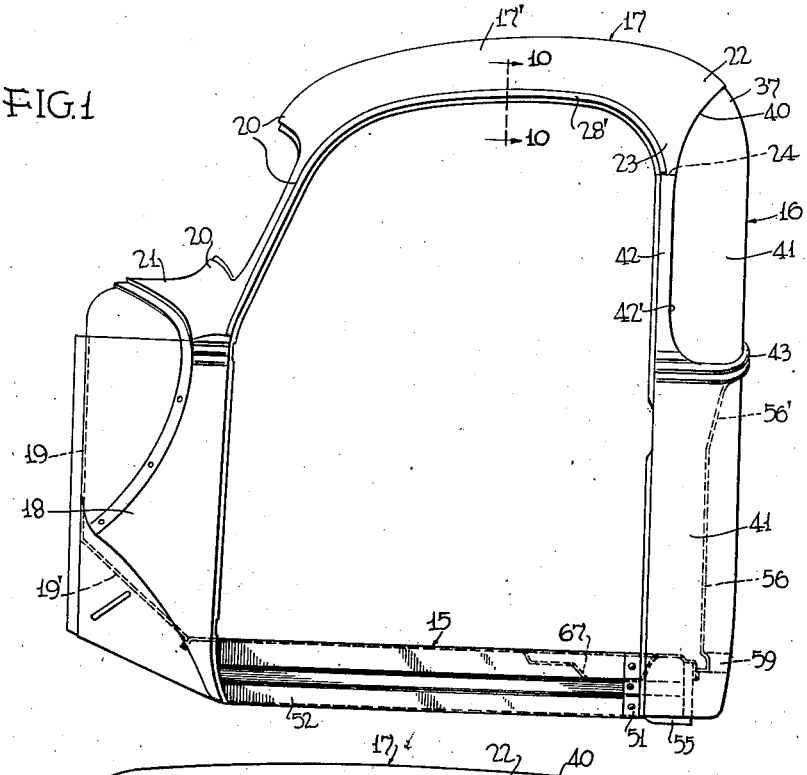
Figure 1 is a side elevation of a cab body, the doors and the windshield being omitted.
Figure 2:
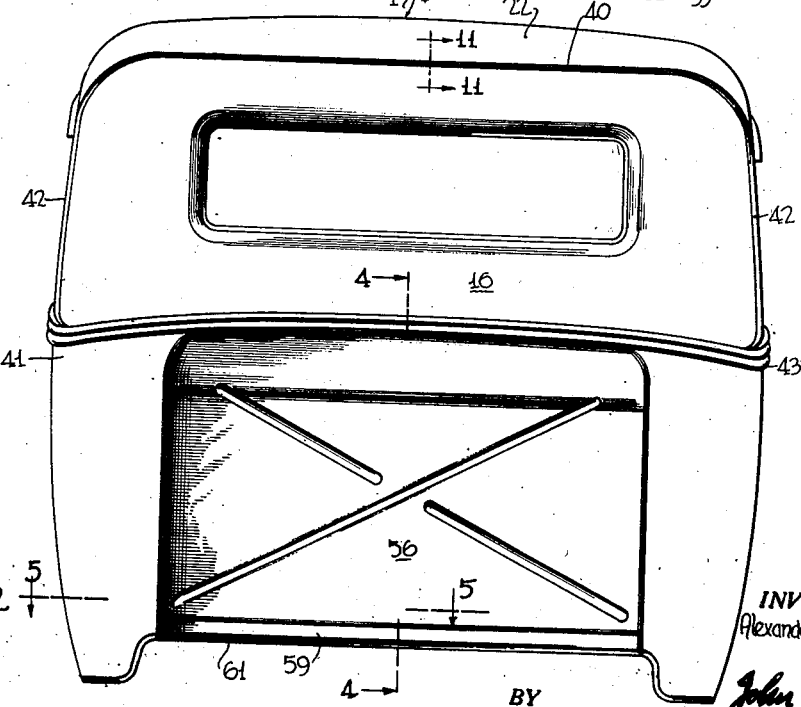
Figure 2 is a rear view elevation of the same cab.

The cab body shown in the drawings is built up from the following main elements: the floor panel 15, the rear wall 16, the roof and front wall 17, the cowl sides 18, and the shroud pan or dashboard 19 with the toe board 19'.

The roof and front wall panel or stamping 17 comprises the roof section 17' proper, the windshield frame 20 and the cowl top 21. At the rear, the roof forms the upper part 22 of the so-called ball-head and is provided at the sides with downward projections or horns 23 which latter end at about the line 24. Along the side margins of the roof panel 17' proper, of the windshield frame 20 and of the horns or extensions 23, the roof is provided on each side with a laterally extending flange 25 which ends in a marginal flange 26. The marginal portion of the stamping 17' together with the flanges 25 and 26 form shallow drip channels. The flange 25 rests and is fastened, such as by spot welding to an outwardly extending flange 27 of the door header 28 which is continued into the front door post. A curved flange 28' extends outwardly and upwardly from the flange 27 and covers the narrow flange 26. The flange 27 is inwardly continued by an upwardly extending portion 29, an inwardly extending portion 30 and by an upwardly facing channel member having an outer wall 31, a bottom wall 32 and an inner wall 33. A substantially flat member 34 has its outer margin welded to the portion 30 and its inner flanged portion 35 to the free margin of the wall 33. The header and front door post structure 28 is very strong owing to the closed box-section formed by the wall portions 31, 32, 33 and the member 34. Further strength is derived from the formation of three channel sections the upwardly facing channel 27, 28', 29; the downwardly facing channel 29, 30, 31 and the upwardly facing channel 31, 32, 33.

The downwardly curved rearward portion 22 and the horns 23 are provided along their rear margin with a forwardly and downwardly extending flange 36. This flange 36 rests against and is fastened such as by electric spot welding to the upper margins of the forwardly curved portion 37 of the rear wall 16, which is likewise provided with a forwardly and downwardly inclined flange 38. The flange 38 is continued by an upwardly and forwardly inclined flange 39 which serves as reinforcement and for the attachment of interior trimming. The roof portions 22, 23 are slightly outwardly offset with respect to the outer surface of the adjoining rear wall portion 37 thereby giving the appearance of a beading by the edge 40 between the roof portions 22, 23 and their flange 36. This edge extends across the ball-head 22, 37 and at the sides of the body downwardly in a pleasant curve to the line 24.

The rear wall 16 has along its vertical sides forwardly extending portions 41 which form the rear corners of the body and the body side wall portions behind the door openings. These side portions 41 are provided above the belt line and adjacent their forward margins with an outwardly offset beading 42. The rear edge 42' of this beading 42 forms a continuation of the edge 40 at the roof and merges in a pleasant curve into the transverse belt line beading 43. The rear wall panel portions 41 terminate above the beading 42 in a horizontal line about coinciding with the line 24. The outer surface of the upper ends of the beadings 42 are arranged in about the same plane as the outer surface of the portions 23 of the roof and the portions 42 and 23 are connected in this region by a joint which is invisible in the finished structure; this joint, being of any well-known construction, is not shown in detail. It will be understood that the joint along the line 24 which requires finishing operations is very short, whereas the long connection between the flanges 36 and 38 does not require such finishing and gives nevertheless to the body a very pleasant ornamental appearance.

The front margins of the rear wall sides 41 and their beadings 42, respectively, are inwardly flanged at 44 so as to form the jamb faces at the rear door posts. An offset 45 along the outer edge of this flange affords the usual recess for the overlapping flange of the door (not shown). A door post member 46 is welded by a marginal outwardly extending flange to the inner margin of each flange 44. A second door post member 47 is welded by its marginal flanges 48 and 49 to said post member 46 and to said offset 45, respectively, the flange 44 and the members 46 and 47 forming together a closed box-sectional post structure on either side of the cab.

The member 46 has at its lower end an inwardly extending tongue 50 and the flange 44 has near its lower end a forwardly extending flange extension 51. The tongue 50 overlaps and is fastened to the top surface of the floor panel 15 and the flange extension 51 overlaps and is fastened to a downwardly extending floor panel flange 52. The flanges 52 form the thresholds and are in the door region each provided with an inwardly directed flange extension 53. This flange extension 53 is overlapped and fastened to an inwardly directed flange 54 of the rear wall extension 41 and of the offset 45. In the rear of the door opening, the flange 54 of the rear wall sides 41 is downwardly bent off at 55 and overlaps and is fastened to a corresponding downwardly extending marginal portion of the floor panel flange 52.

The entire central area of the rear panel 16 below the belt line 43 is forwardly offset. This offset has a transversely extending wall portion 56, vertical side wall portions 57 and upper wall portion 58 and a transverse beading 59 along its lower margin. The lower edge of the beading 59 is provided with a forwardly directed flange 60. This flange 60 follows the curvature of the lower margin of the offset portions 56, 57 and their beading 59, extends from there downwardly and laterally along the bottom edge of the rear wall proper and merges into the flanges 54 along the rear wall side portions 41. In the region of the offset wall portion 56, the flange 60 is continued by a downwardly extending flange 61, the latter ending, however, at the side portions 57 of the rear wall offset. The flange 61 is continued at both ends by a flange 63 along one margin of a corner piece 62. These corner pieces overlap with their correspondingly shaped remaining margins, the adjoining portions of the flanges 60 and 54.

The floor panel 15 is provided along its rear edge, which is substantially straight in plan view and in end elevation, with a downwardly depending flange 64 which overlaps and is fastened to the flange 61 of the rear wall. The lateral end portions of the floor panel flange 64 are each overlapped and welded to a corner piece 65. The lower margin of this corner piece 65 follows, overlaps and is welded to the flange 63 of the corner piece 62. The forwardly bent off flange 66 of the piece 65 overlaps and is welded to the rear end of the floor panel threshold flange 52.

A well or offset 67 is formed in the floor panel 15 and has side walls and a rear wall 68. This well may serve for the reception of a fuel tank, tools or the like. These walls 68 form together with the adjoining portions of the main body of the floor panel 15 and the marginal floor panel flanges 52 and 64 downwardly facing intercommunicating channel members which contribute materially to the strength and the rigidity of the floor panel structure. A further reinforcing channel is formed by the beading 59, its flange 60 and the floor panel flange 64.

Braces 69 are inserted between the rear wall offset 56 and the door posts 46, 47. Similar braces 70 are connected to said wall portion 56 and the frame 71 which latter surrounds the rear view opening 72. A further brace 73 extends between said window frame 71 and the upper ends of the rear door posts.

The roof panel together with the windshield frame and the cowl top is easy to manufacture. The same applies to the rear wall 16 with its forward extensions 41 and its offsets 56 to 58, and it applies also to the floor panel with its fuel tank or tool box depression 67, 68, its straight flanged rear edge 64 and threshold portions 52. The somewhat intricate formation in the lower rear corners of the body is taken care of by the use of small simple corner pieces 62, 65 which may be manufactured with inexpensive dies from scrap material and put into place without difficulty and with very little work.

The offset wall portion 56 does not occupy any useful space but occupies the space behind the seat back cushion (not shown) and which does mostly not serve any purpose in known constructions. This offset forms simultaneously the upper support for the seat back cushion (not shown) by its inclined upper portion 56'. Brackets 74 which are simply welded or otherwise fastened to the sides 57 of the rear wall offset serve for holding the lower portion of the seat cushion.

The number of parts entering into the cab body is greatly reduced in comparison with hitherto customary constructions. Also the weight is decreased. Yet, the strength of the cab is not weakened but rather increased due to the offsets, the beadings, overlapping flanges, etc. which are formed in the different members, by their relative arrangement and their connections.

Chassis sills, which are not shown, extend beneath the body flooring and inside of the downwardly extending flanges 52 and the lower marginal side portions of the rear wall 16 and the cowl sides 18. The cab is preferably supported on such chassis sills in the region of the rear and front door posts and of the shroud pan 19. Fastening bolts (not shown) may pass through the rear post flanges 50.

The invention allows many modifications. Certain of its features may be used independently of other features. All those modifications falling within the spirit of the invention are intended to be covered by the following claims.

What is claimed is:

1. In a vehicle body: a roof panel downwardly curved at its longitudinal and rear sides; a rear wall panel having its marginal vertical side portions and the generally horizontal upper marginal portion forwardly curved; said panels ending at about the upper and rear margins respectively of side wall openings; said roof panel extending for a short distance rearwardly beyond the rear margins of said openings and having in the region of the rear upper corners of the opening narrow downward extensions or horns fitting into corresponding recesses in the upper portion of the rear wall panel; forwardly directed flanges along the rear margin of said roof panel and its projections or horns and along the upper margin of the rear wall panel which overlap and are secured to each other; the rear marginal roof panel portion being so slightly outwardly offset with respect to the adjoining portion of the rear wall panel as not to affect materially the impression of a continuous, yet only slightly beaded, surface in and adjacent the connecting region; beads formed on said rear wall panel constituting apparent continuations of the ends of said offset rear marginal roof panel portion; said offset marginal roof panel portion and said beads of the rear wall panel affording an attractive-looking beading and providing in combination with said flanges a connection which requires practically no final finishing operation.

2. In a vehicle body according to claim 1: the lower ends of said roof panel projections or horns merging without offset into the adjoining ends of the beads of the rear wall and being connected thereto by a joint which is flush with the panel portions thereabove and therebelow.

3. In a driver's cab for a vehicle, a roof panel downwardly curved at its longitudinal sides and at its rear side: a rear wall panel having forwardly curved extensions along its vertical sides; the roof panel and the rear wall panel ending at about the upper and rear margins respectively of side wall openings; said roof panel extending for a short distance beyond the rear margins of said openings; the rear wall panel being in its upper portion cut out so as to receive the extended portions of said roof panel; forwardly directed overlapping and connected flanges along the margins of said roof panel and the upper margin of said rear wall panel; the edge between the roof panel flange and the adjoining roof panel portion being slightly outwardly offset with respect to the edge between said rear wall panel flange and the adjoining portion of the rear wall panel proper; said rear wall extensions being provided, at least above the belt line, along their forward vertical margins with a beading each, the rear edges of which merge into and form continuations of the beading afforded by said offset rear roof edge; said offset edge and the rear edge of said beadings affording an attractive-looking ornamental line and providing in combination with said flanges a connection which practically requires no final finishing operations.

4. A rear wall of a driver's cab for vehicles having its main portion between its vertical sides and below the belt line uninterruptedly forwardly offset, the depth of said offset in the longitudinal direction of the vehicle being in the order of the thickness or depth of usual reinforcing members such as window rails or door posts so that the offset constitutes a reinforcing structure for said panel and allows the omission of hitherto usual separate inner reinforcing members extending across the panel.

5. A rear wall of a driver's cab for vehicles having its main portion between its vertical sides and below the belt line forwardly offset, the depth of said offset in the longitudinal direction of the vehicle being in the order of the thickness or depth of usual reinforcing members such as window rails or door posts so that the offset constitutes a reinforcing structure for said panel and allows the omission of hitherto usual separate inner reinforcing members extending across the panel, said offset portion being shaped as a support for a seat back cushion.

6. A rear wall of a driver's cab for vehicles having its main portion between its vertical sides and below the belt line forwardly offset, the depth of said offset in the longitudinal direction of the vehicle being in the order of the thickness or depth of usual reinforcing members such as window rails or door posts so that the offset constitutes a reinforcing structure for said panel and allows the omission of hitherto usual separate inner reinforcing members extending across the panel, additional bracing means being fastened to said offsets and being adapted to be fastened to parts of the cab remote from said offset.

7. A rear wall of a driver's cab for vehicles having its main portion between its vertical sides and below the belt line forwardly offset, said offset extending uninterruptedly across the middle of the wall and near to the side margins thereof and being of considerable depth, the depth of said offset in the longitudinal direction of the vehicle being in the order of the thickness or depth of usual reinforcing members such as window rails or door posts so that the offset constitutes a reinforcing structure for said panel and allows the omission of hitherto usual separate inner reinforcing members extending across the panel, a beading along the lower part of said offset, said offset and its beading acting as a reinforcing structure for said panel.

8. A rear wall of a driver's cab for vehicles having its main portion between its vertical sides and below the belt line uninterruptedly forwardly offset, the depth of said offset in the longitudinal direction of the vehicle being in the order of the thickness or depth of usual reinforcing members such as window rails or door posts so that the offset constitutes a reinforcing structure for said panel and allows the omission of hitherto usual separate inner reinforcing members extending across the panel, a forwardly and then downwardly extending flange along the lower margin of said offset, said offset and its flange acting as a reinforcing structure for said panel, said downturned flange being substantially straight transversely in plan and being adapted for the fastening of a floor panel with a correspondingly straight flanged rear margin.

9. In a driver's cab with a rear wall having its main portion between its vertical sides and below the belt line uninterruptedly forwardly offset, the depth of said offset in the longitudinal direction of the vehicle being in the order of the thickness or depth of usual reinforcing members such as window rails or door posts so that the offset constitutes a reinforcing structure for said panel and allows the omission of hitherto usual separate inner reinforcing members extending across the panel, a forwardly and then downwardly extending flange along the lower margin of said offset, said offset and its flange acting as a reinforcing structure for said panel, said downturned flange being substantially straight in a vertical transverse plane and being adapted for the fastening of a floor panel with a correspondingly straight flanged rear margin, said rear wall having its vertical side portions forwardly curved and extended; filler pieces having a margin arranged in about the vertical transverse plane of said downturned flange between the ends of the lower margin of the offset and said forwardly extended side portions; said filler pieces presenting continuations of the straight attachment flange for the floor panel.

10. A rear wall portion of a driver's cab for vehicles provided between its vertical sides and below the belt line with a forwardly directed offset; said offset extending uninterruptedly across the middle of the rear wall portion and near to the side margins thereof and being of considerable depth; said rear wall portion having its vertical sides forwardly curved and extended; the vertical side portions of said offset and said forwardly extended portions forming together post-like, hollow section structures which together with the offset as a whole materially reinforce and stiffen the rear wall portion.

11. A rear wall portion of a driver's cab for vehicles provided between its vertical sides and below the belt line with a forwardly directed offset and having its vertical side portions forwardly curved and extended; the vertical side portions of said offset and said forwardly extended portions forming together hollow section structures which together with the offset as a whole materially reinforce and stiffen the rear wall portion; said forwardly extended rear wall portions extending downwardly below the level of the lower margin of the offset; filler pieces extending from the ends of the lower margin of the offset to the lower margins of the rear wall extensions and filling the curved lower corners of the rear wall at the sides of the offset.

12. A rear wall portion and filler pieces according to claim 11; the lower margin of said offset and said filler pieces presenting an attachment surface substantially straight in plan view for the rear edge of a floor panel.

13. A floor panel for a vehicle body especially for a driver's cab, said floor panel being provided along its longitudinal side margins and along a transverse margin with downturned flanges and a portion of the main body of the floor panel extending closely to said marginal flanges being downwardly offset, intercommunicating hollow section beam structures being formed by said flanges, the side walls of said offset and the intervening portions of the floor panel.

14. In a structure according to claim 13, said longitudinal flanges serving as thresholds below door openings and for the attachment of door posts, said transverse flange serving for the attachment of an adjoining transversely extending member of the body.

ALEXANDER R. LINDSAY.